(12) United States Patent
Kim et al.

(10) Patent No.: US 7,867,125 B2
(45) Date of Patent: Jan. 11, 2011

(54) REAR WHEEL DRIVE APPARATUS FOR FOUR WHEEL DRIVE (4WD) HYBRID ELECTRIC VEHICLE

(75) Inventors: Yeon Ho Kim, Gyeonggi-do (KR); Wan-Soo Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 494 days.

(21) Appl. No.: 12/005,884

(22) Filed: Dec. 28, 2007

(65) Prior Publication Data
US 2009/0111641 A1   Apr. 30, 2009

(30) Foreign Application Priority Data
Oct. 29, 2007   (KR) ................... 10-2007-0108624

(51) Int. Cl.
*F16H 48/06* (2006.01)
(52) U.S. Cl. ...................... 475/150; 475/221
(58) Field of Classification Search .......... 475/150, 475/221; 180/243, 65.6
See application file for complete search history.

(56) References Cited

U.S. PATENT DOCUMENTS

| | | | | |
|---|---|---|---|---|
| 1,032,068 A | * | 7/1912 | Krohn | 475/157 |
| 4,412,459 A | * | 11/1983 | Goscenski, Jr. | 475/86 |
| 5,443,130 A | * | 8/1995 | Tanaka et al. | 180/65.6 |
| 5,620,387 A | * | 4/1997 | Janiszewski | 475/150 |
| 5,637,048 A | * | 6/1997 | Maeda et al. | 475/150 |
| 5,845,732 A | * | 12/1998 | Taniguchi et al. | 180/65.6 |
| 6,074,321 A | * | 6/2000 | Maeda et al. | 475/221 |
| 6,484,834 B2 | * | 11/2002 | Bowen et al. | 180/65.6 |
| 6,499,549 B2 | * | 12/2002 | Mizon et al. | 180/65.6 |
| 6,540,035 B2 | * | 4/2003 | Nagano et al. | 180/65.21 |
| 6,558,289 B2 | | 5/2003 | Chung | |
| 6,595,308 B2 | * | 7/2003 | Bowen | 180/65.6 |
| 6,604,591 B2 | * | 8/2003 | Bowen et al. | 180/65.6 |
| 6,892,837 B2 | * | 5/2005 | Simmons et al. | 180/6.44 |
| 7,216,732 B2 | * | 5/2007 | Angerer et al. | 180/65.6 |
| 7,247,117 B2 | * | 7/2007 | Forster | 475/221 |
| 7,384,357 B2 | * | 6/2008 | Thomas et al. | 475/5 |
| 7,507,178 B2 | * | 3/2009 | Rosemeier et al. | 475/205 |
| 7,549,940 B2 | * | 6/2009 | Kira et al. | 475/204 |

FOREIGN PATENT DOCUMENTS

| | | |
|---|---|---|
| JP | 11-2990007 | 10/1999 |
| JP | 2000-13922 | 1/2000 |
| JP | 2005-29118 | 2/2005 |
| JP | 2006-131132 | 5/2006 |
| KR | 10-2004-0020841 | 3/2004 |
| KR | 10-2004-0074946 | 8/2004 |
| KR | 10-2005-0054440 | 6/2005 |

* cited by examiner

*Primary Examiner*—Sherry Estremsky
(74) *Attorney, Agent, or Firm*—Edwards Angell Palmer & Dodge LLP; Peter F. Corless

(57) ABSTRACT

In one aspect, a real wheel drive apparatus is provided for a four wheel drive hybrid electric vehicle includes: a motor generator for driving rear wheels; a reduction gear set for reducing an output speed of the motor generator and transmitting the reduced output speed; a differential gear set interposed between the reduction gear set and right and left wheel shafts of the rear wheels and a clutch unit interposed between the differential gear set and the wheel shaft to perform a differential limiting.

5 Claims, 11 Drawing Sheets

(I)

(II)

REAR WHEEL DRIVE APPARATUS FOR FOUR WHEEL DRIVE (4WD) HYBRID ELECTRIC VEHICLE

CROSS-REFERENCE TO RELATED APPLICATION

This application claims the benefit under 35 U.S.C. §119(a) on Korean Patent Application No. 10-2007-108624, filed on Oct. 29, 2007, the entire contents of which are incorporated herein by reference.

BACKGROUND

1. Technical Field

The present invention relates to a rear wheel drive apparatus for a hybrid electric vehicle, and more particularly, to a rear wheel drive apparatus for a four wheel drive (4WD) hybrid electric vehicle which includes a motor is generator for driving rear wheels, a reduction gear set for reducing an output speed of the motor generator and transmitting the decelerated output, and a differential gear set for appropriately distributing torque transmitted through the reduction gear set to wheel shafts of rear wheels so as to have different rotation speeds.

2. Background Art

Generally, a hybrid electric vehicle (HEV) is a vehicle which efficiently combines two or more types of power sources to drive itself. A typical hybrid electric vehicle obtains driving force through an engine using fuel and an electric motor driven by electric power of a battery.

Researches on a hybrid electric vehicle have been actively undergone in accordance with the demand of the times for improving a fuel consumption ratio and development of environment-friendly products.

A hybrid electric vehicle has an electric vehicle (EV) mode which is a pure electric vehicle mode in which a vehicle is driven by torque of a motor selectively according to a state of charge (SOC) of a battery and a driving state, an engine mode in which a vehicle is driven by torque of an engine, a HEV mode which is an auxiliary mode which uses torque of an engine as a main power and torque of a motor driven by a battery power as an auxiliary power, and a regenerative braking (RB) mode in which braking and inertia energy are collected through generation of electric power in a motor to be charged into a battery during driving using braking or inertia of a vehicle.

A hybrid electric vehicle has a structure which appropriately combines two power sources, i.e., engine and motor and has an improved fuel consumption ratio due to power support of a motor driven by a battery power when a vehicle starts or accelerates.

In a 4WD hybrid electric vehicle, a reduction gear set reduces an output speed transmitted from an output shaft of a rear wheel driving motor and transmits the reduced output speed to a differential gear set. Before transmitting the electric power to a wheel shaft from the output shaft of the driving motor, the reduction gear set reduces the rotation speed from the output shaft of the driving motor to increase torque, thereby finally achieving a deceleration.

The differential gear set appropriately distributes torque transmitted through the reduction gear set to respective wheel shafts of rear wheels to have different rotation speeds. The differential gear set automatically makes a rotation difference when a rotation difference between left and right wheels is required in case where a vehicle turns or moves on an uneven road surface, leading to smooth driving.

FIGS. 1 to 3 are schematic views illustrating reduction gear sets and differential gear sets of a conventional 4WD hybrid electric vehicle.

Referring to FIG. 1, a motor generator (MG) 1 is arranged for a rear wheel drive, a reduction gear set 3 and a differential gear set 5 are arranged to transmit driving force of the motor generator 1 to left and right wheel shafts 6a and 6b.

In a power transmitting structure of FIG. 1, a three-shaft structure is employed which includes a motor output shaft 2 coupled to the motor generator 1, a middle shaft 4 for receiving torque of the motor output shaft 2 through the reduction gear set 3, and the wheel shafts 6a and 6b for receiving driving force of the middle shaft 4 distributed by the differential gear set 5. The motor generator 1, the reduction gear set 3 and the differential gear set 5 cooperate with each other to perform vehicle driving, a regeneration function and a differential function.

As the differential gear set 5, a differential gear set of a straight bevel gear type is used, and three gear sets are used in the power transmitting structure of FIG. 1.

A power transmitting structure of FIG. 2 employs a three-shaft structure which includes the motor output shaft 2, the middle shaft 4 and the wheel shafts 6a and 6b together with the reduction gear set 3 and the differential gear set 5. The power transmitting structure of FIG. 2 further includes an electronic clutch 7. The motor generator 1, the reduction gear set 3 and the differential gear set 5 cooperate with each other to perform vehicle driving and a differential function.

As the differential gear set 5, a differential gear set of a straight bevel gear type is used, and three gear sets are used in the power transmitting structure of FIG. 2.

A power transmitting structure of FIG. 3 employs a single shaft structure which is simpler. A stepped-pinion planetary gear is used in the power transmitting structure of FIG. 3, and the motor generator 1, the reduction gear set 3 and the differential gear set 5 cooperate with each other to perform vehicle driving, a regeneration function and a differential function.

As the differential gear set 5, a differential gear set of a straight bevel gear type is used, and three gear sets are used in the power transmitting structure of FIG. 3.

All of the rear wheel drive apparatuses of the conventional 4WD hybrid electric vehicle described above have the differential gear set of the straight bevel gear type, and employs the three-shaft structure or has three gear sets, whereby the number of parts is high and the structure is very complicated.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the aforementioned problems associated with prior arts. One object of the present invention is to provide a rear wheel drive apparatus for a 4WD hybrid electric vehicle with an improved structure that can provide increased mechanical and spatial efficiency, reduced number of parts, simplified structure, and reduced manufacturing cost.

In a preferred embodiment, the present invention provides a real wheel drive apparatus for a four wheel drive hybrid electric vehicle, comprising: a motor generator for driving rear wheels; a reduction gear set for reducing an output speed of the motor generator and transmitting the reduced output speed; a differential gear set interposed between the reduction gear set and right (RH) and left (LH) wheel shafts of the rear wheels; and a clutch unit interposed between the differential gear set and the wheel shaft to perform a differential limiting. In this embodiment, the motor generator, the reduction gear set, the differential gear set, and the differential limiting clutch unit are arranged in a single shaft structure according to the wheel shafts in a state that the LH wheel shaft is inserted into a hollow inner part of an output shaft of the motor generator. Also, the reduction gear set includes a planetary gear set in which a ring gear is fixed, a sun gear is coupled to the motor output shaft, and a carrier is provided through which output is transmitted. Further, the differential gear set includes a first planetary gear set interposed between the carrier of the reduction gear set and the LH wheel shaft, and a second planetary gear set interposed between the first planetary gear set and the RH wheel shaft.

In another preferred embodiment, the first planetary gear set is provided with a sun gear and a carrier. The sun gear is coupled to the carrier of the reduction gear set. The carrier of the first planetary gear set is coupled to the LH wheel shaft.

In still another preferred embodiment, the second planetary gear set includes a sun gear coupled to the RH wheel shaft and a carrier between which and the RH wheel shaft the differential limiting clutch unit is interposed.

In yet another preferred embodiment, the first planetary gear set includes pinions, the second planetary gear set includes pinions (27), and the pinions of the first and second planetary gear sets are formed integrally with each other.

In this embodiment, the second planetary gear set is, preferably, a planetary gear set of a double pinion type having an internal pinion engaged with the sun gear and an external pinion engaged with the internal pinion, and the external pinion is formed integrally with the pinion of the first planetary gear set.

Also preferably, the second planetary gear set may be a planetary gear set of a single pinion type in which the pinion is formed integrally with the pinion of the first planetary gear set.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

BRIEF DESCRIPTION OF THE DRAWINGS

The above and other features of the present invention will be described in reference to certain exemplary embodiments thereof with reference to the attached drawings in which.

DETAILED DESCRIPTION

Figure 1:
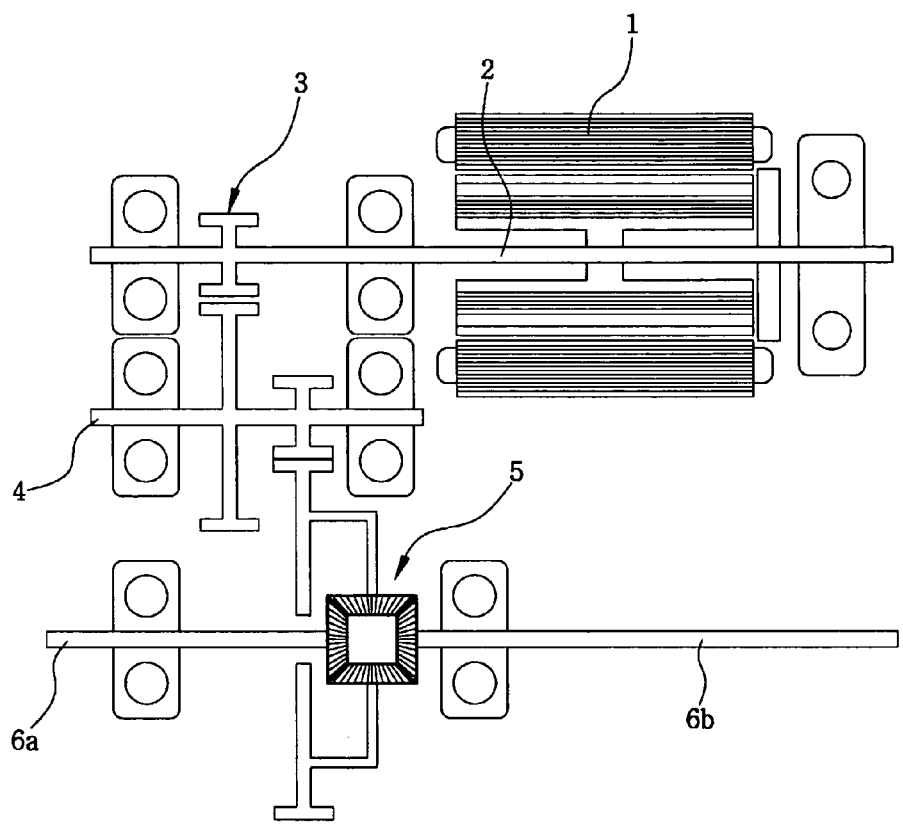
FIGS. 1 to 3 are schematic views illustrating reduction gear sets and differential gear sets for a conventional 4WD hybrid electric vehicle.
Figure 2:
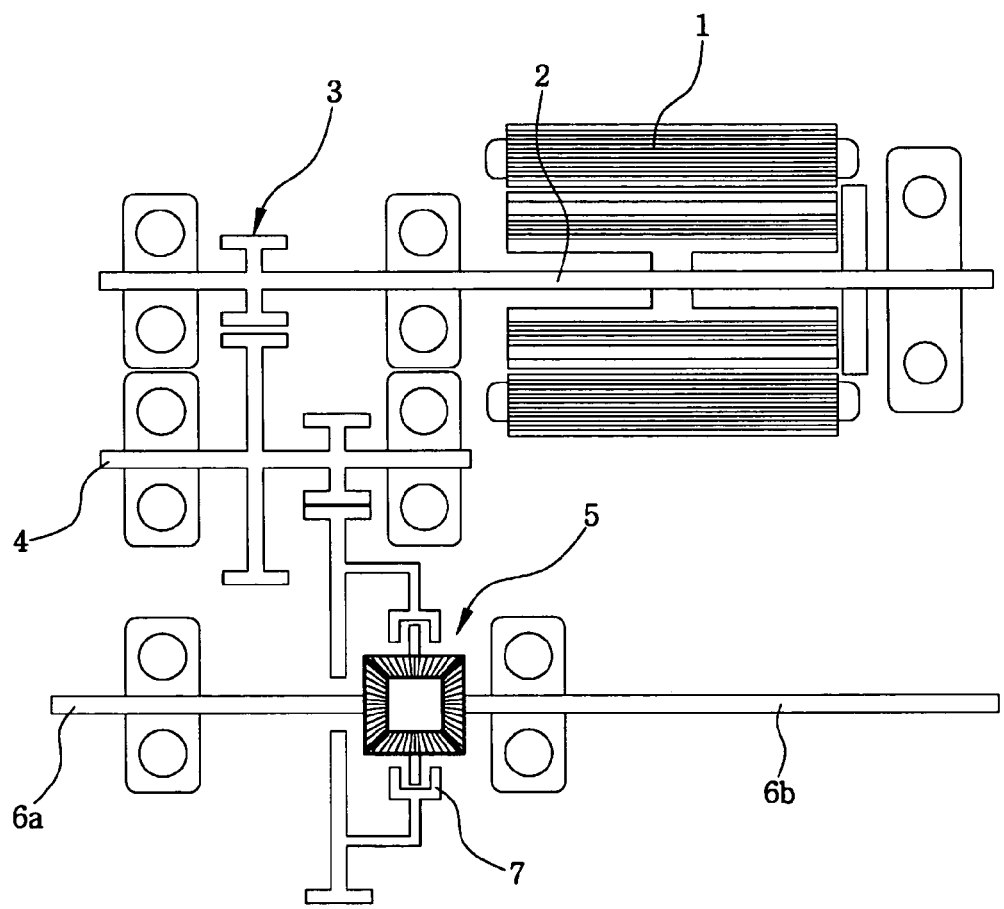
Figure 3:
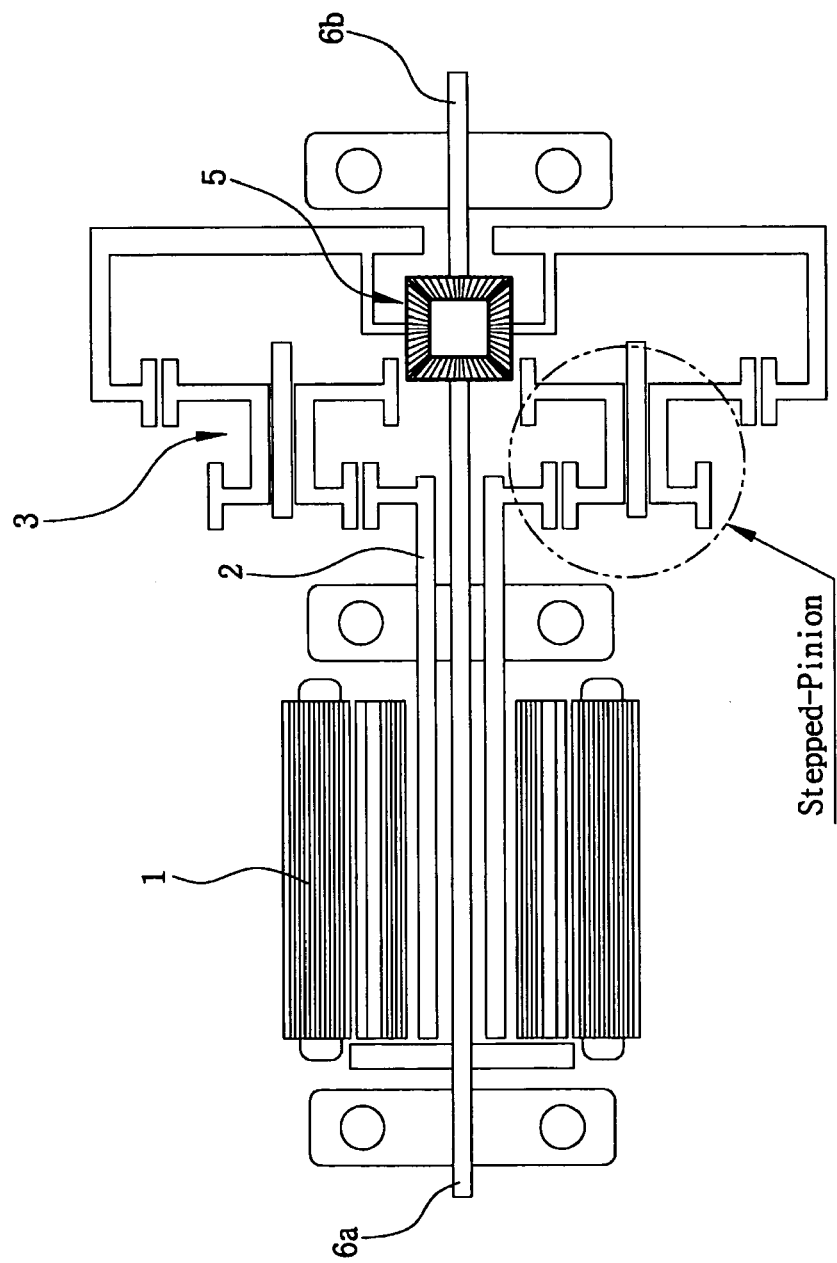

Reference will now be made in detail to the embodiments of the present invention, examples of which are illustrated in the accompanying drawings, wherein like reference numerals refer to the like elements throughout. The embodiments are described below in order to explain the present invention by referring to the figures.

The present invention relates to a rear wheel drive apparatus of a 4WD hybrid electric vehicle which employs a differential gear set and a reduction gear set which are configured of a compound planetary gear type. Instead of removing a bevel gear structure of the conventional differential gear set, a motor, a reduction gear set, a differential gear set, and a differential limiting clutch unit are arranged on one shaft (vehicle wheel shaft) to perform a vehicle driving, a regeneration function, a differential function, and a differential limiting function.

Figure 4:
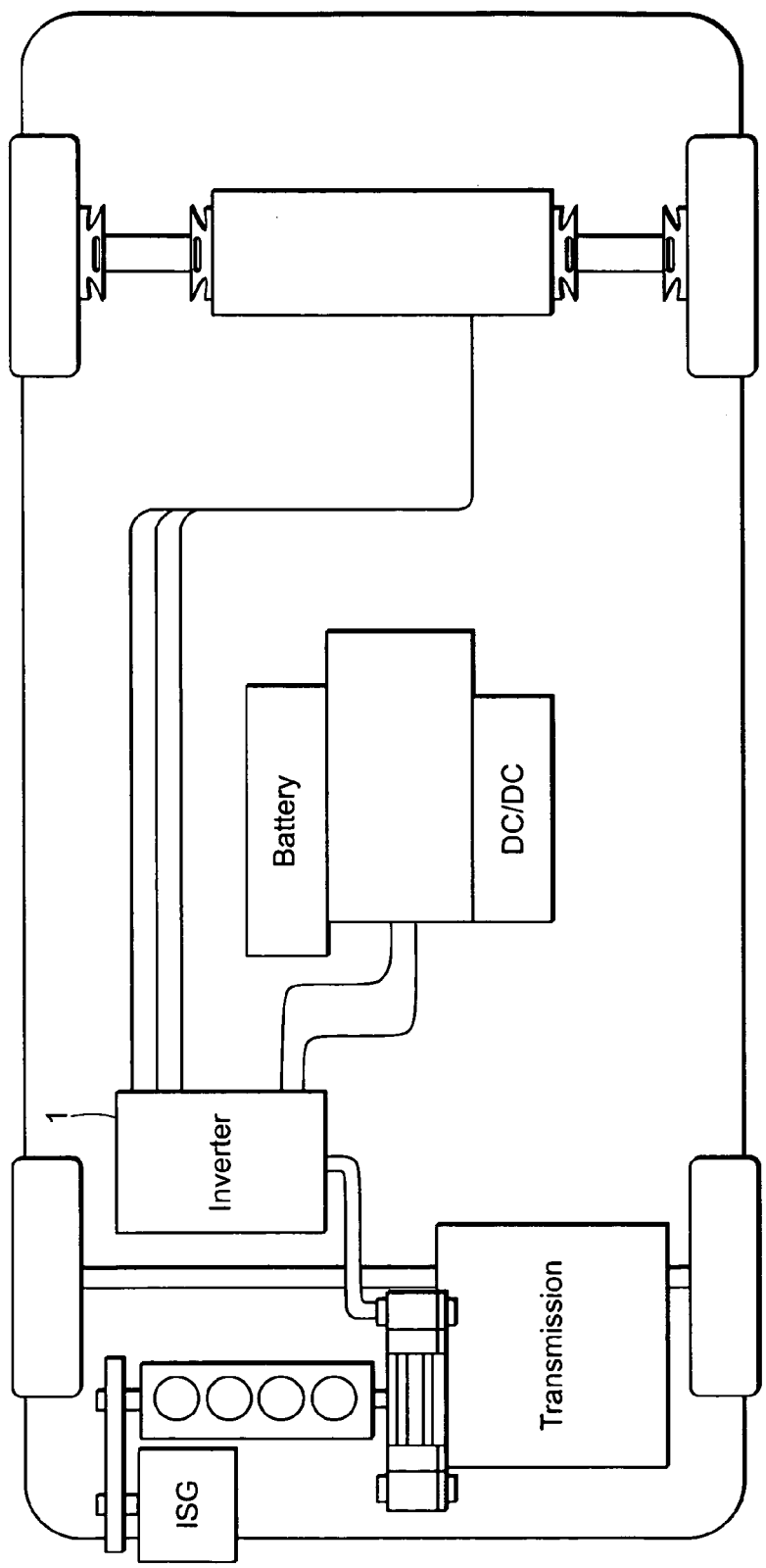
FIG. 4 is a schematic view illustrating a drive apparatus for a 4WD hybrid electric vehicle.
Figure 5:
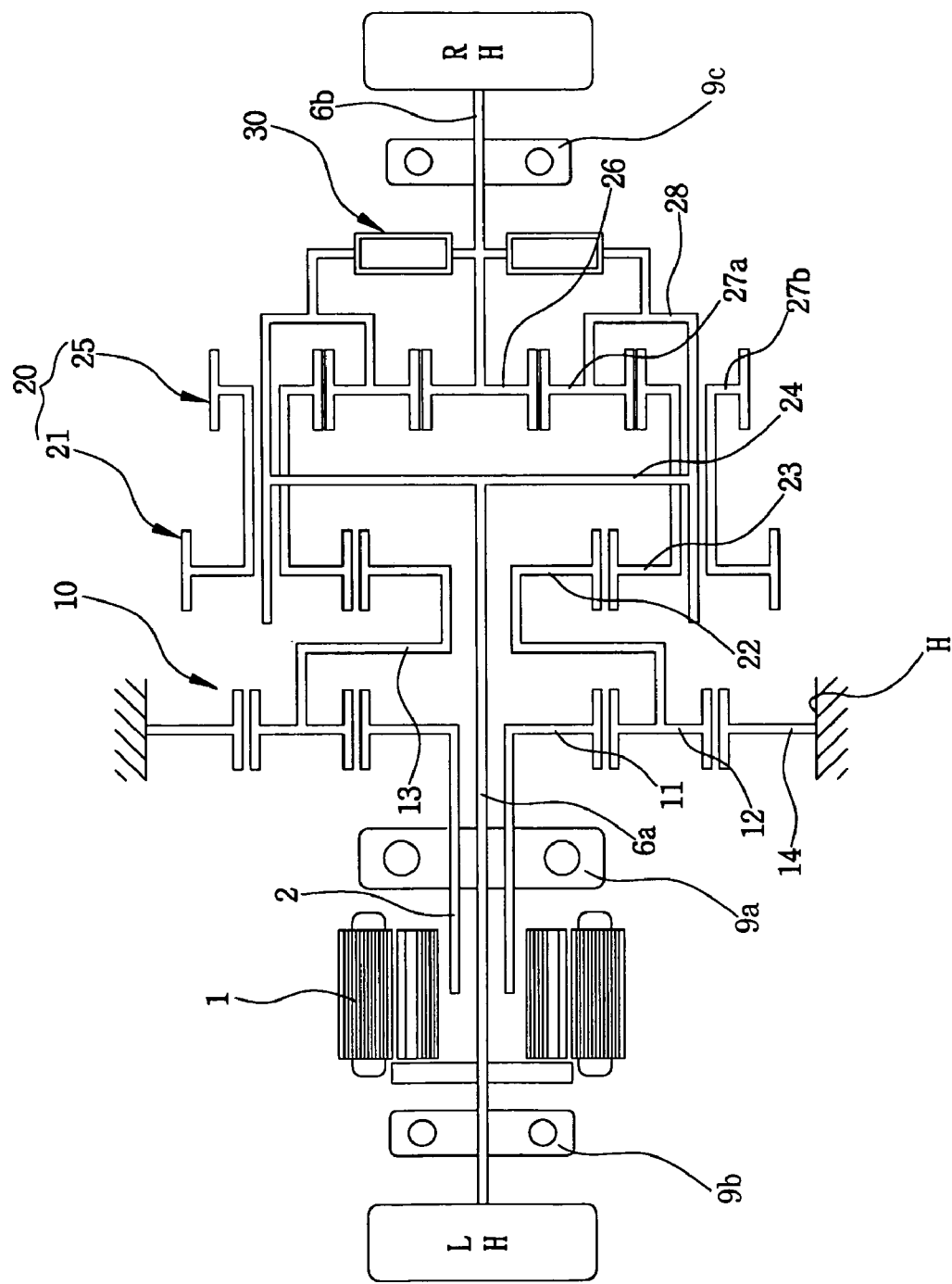
FIG. 5 is a schematic view illustrating a rear wheel drive apparatus for a 4WD hybrid electric vehicle according to a first preferred embodiment of the present invention.

FIG. 4 is a schematic view illustrating a drive apparatus for a 4WD hybrid electric vehicle, and FIG. 5 is a schematic view illustrating a rear wheel drive apparatus for a 4WD hybrid electric vehicle according to one exemplary embodiment of the present invention.

In FIG. 5, reference numerals 9a, 9b, and 9c denote bearings which support a motor output shaft 2, an LH wheel shaft 6a, and a RH wheel shaft 6b, respectively.

The rear wheel drive apparatus according to the present invention is employed in a 4WD hybrid electric vehicle, includes a motor generator coupled to an inverter I to be driven and a power transmitting structure (e.g., reduction gear set and differential gear set) for transmitting torque to vehicle wheels and operates to drive rear wheels, as shown in FIG. 4.

Referring to FIG. 5, the rear wheel drive apparatus of the present invention includes a motor generator 1 for a rear wheel drive, a reduction gear set 10 for reducing the output speed of the motor generator and transmitting the reduced output speed, a differential gear set 20 which appropriately distributes torque transmitted through the reduction gear set 10 to the wheel shafts 6a and 6b of rear wheels to have different rotation speeds, and a clutch unit 30 for selectively performing a differential limiting function.

The rear wheel drive apparatus of the present invention has a single shaft structure of a coaxial shaft structure in which the wheel shaft 6a of a left wheel is inserted into a hollow inner part of the output shaft 2 of the motor generator 1. In such a single shaft structure, the motor generator 1, the reduction gear set 10, and the differential gear set 20 are arranged such that the driving force of the motor generator 1 is transmitted to the reduction gear set 10 and the differential gear set 20 to be then distributed to the wheel shafts 6a and 6b.

The reduction gear set 10 and the differential gear set 20 are configured as a planetary gear set. The planetary gear sets of the reduction gear set 10 and the differential gear set 20 have a compound planetary gear type in which components are coupled directly to each other to transmit an electric power without using a separate coupling shaft.

The reduction gear set 10 is configured as a planetary gear set which includes a sun gear 11, a pinion 12, a carrier 13, and a ring gear 14. The ring gear 14 is fixed to a reduction gear set housing H. That is, the reduction gear set 10 is configured as a planetary gear set in which the ring gear 14 is fixed.

In the planetary gear set of the deceleration 10, the output shaft 2 is coupled directly to the sun gear 11, and the carrier 13 is coupled to an input side of the differential gear set 20, so that in the reduction gear set 10, the sun gear 11 serves as an input side for receiving a motor output, and the carrier 13 serves as an output side for transmitting a power (i.e., rotation power of the motor generator).

The differential gear set 20 includes a first planetary gear set 21 (no ring gear) which includes a sun gear 22, a pinion 23, and a carrier 24, and a second planetary gear set 25 (no ring gear) which includes a sun gear 26, pinions 27a and 27b, and a carrier 28. The second planetary gear set 25 has a double pinion type in that the pinion 27b is integrated with the pinion 23 of the first planetary gear set 21.

The first and second planetary gear sets 21 and 25 are configured such that the two pinions 23 and 27b are integrated, and the carrier 24 of the first planetary gear set 21 and the carrier 28 of the second planetary gear set 25 are designed to rotate together.

The first planetary gear set 21 serves to receive a power from the reduction gear set 10 and output the power to the left wheel shaft 6a (hereinafter, LH wheel shaft). The carrier 13 of the reduction gear set 10 is coupled to the sun gear 22 of the first planetary gear set 21, and the LH wheel shaft 6a is coupled to the carrier 24 of the first planetary gear set 21.

In the first planetary gear set 21, the sun gear 22 serves as an input side for receiving a power (i.e., decelerated driving force) from the reduction gear set 10, and the carrier 24 which is coupled to the sun gear 22 through the pinion 23 serves as an output side of outputting the power to the LH wheel shaft 6a, so that the output is outputted from the carrier 24 to the LH wheel shaft 6a.

The second planetary gear set 25 is a gear means for receiving a power from the first planetary gear set 21 and outputting the power to the right wheel shaft (hereinafter, RH wheel shaft) 6b. Employed is a planetary gear set of a double pinion type which has the internal pinion 27a and the external pinion 27b which is engaged with the internal pinion 27a as an external gear.

In the second planetary gear set 25, the external pinion 27b is formed integrally with the pinion 23 of the first planetary gear set 21, and the RH wheel shaft 6b is coupled to the sun gear 26 of the second planetary gear set 25.

That is, in the second planetary gear set 25, the external pinion 27b serves as an input side for receiving the power from the first planetary gear set 21, and the sun gear 26 serves as an output side for outputting the power to the RH wheel shaft 6b, so that the power is outputted from the sun gear 26 to the RH wheel shaft 6b.

As shown in FIG. 5, the planetary gear set of the double pinion type has a structure in which the internal pinion 27a is interposed between the external pinion 27b and the sun gear 26, and thus the power is transmitted through a path which is comprised of the external pinion 27b, the internal pinion 27a, the sun gear 26, and the RH wheel shaft 6b.

Meanwhile, the clutch unit 30 for selectively performing a differential limiting function is interposed between the differential gear set 20 and the RH wheel shaft 6b. The clutch unit 30 is interposed between the carrier 28 and the RH wheel shaft 6b of the second planetary gear set 25 to selectively control the transmission of the power.

A connection of the clutch unit 30 operates when a differential limiting function is performed, whereas a connection of the clutch unit 30 is released when a differential limiting function is not performed. A differential function of the differential gear set 20 is normally performed in a state that a connection of the clutch unit 30 is released. To the contrary, in a connection state of the clutch unit 30, the LH wheel shaft 6a operates together with the RH wheel shaft 6b through the carriers 24 and 28 of the differential gear set 20, and so a differential limiting state in which an LH output and a RH output is 1:1 is maintained.

When the driving force of the motor generator 1 is decelerated and then transmitted to the differential gear set 20, the differential gear set 20 diverges the power to the LH wheel shaft 6a and the RH wheel shaft 6b through the first and second planetary gear sets 21 and 25, and at this time the LH output is performed through the carrier 24 of the first planetary gear set 21, and the RH output is performed through the sun gear 26 of the second planetary gear set 25.

Figure 6:
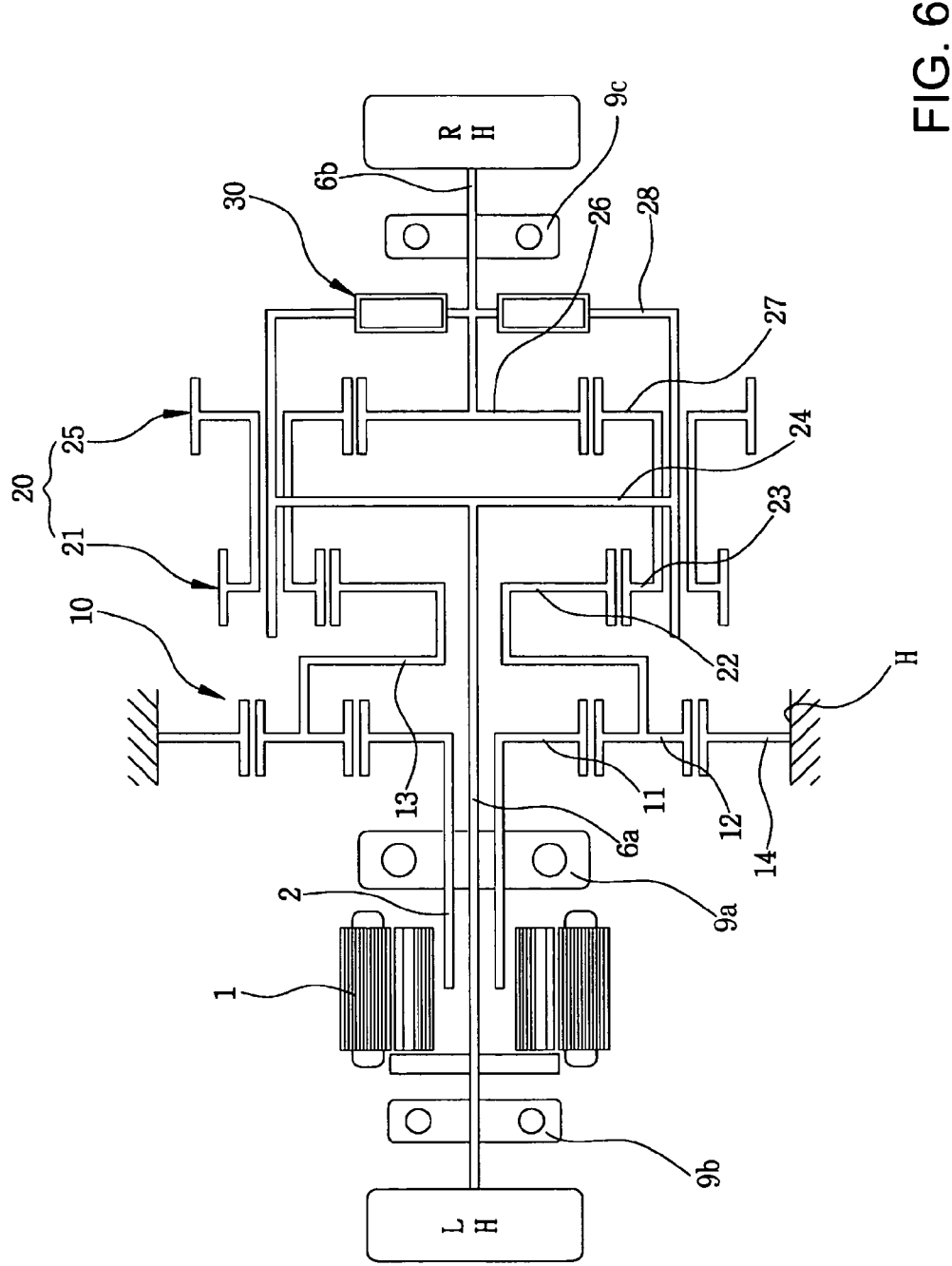
FIG. 6 is a schematic view illustrating a rear wheel drive apparatus for a 4WD hybrid electric vehicle according to a second preferred embodiment of the present invention.

FIG. 6 is a schematic view illustrating a rear wheel drive apparatus for a 4WD hybrid electric vehicle according to another exemplary embodiment of the present invention. The rear wheel drive apparatus of another exemplary embodiment of the present invention is different from that of one exemplary embodiment of the present invention in the fact that a second planetary gear set 25 of a differential gear set 20 is a planetary gear set of a single pinion type. The remaining configuration and operation are same as those of one exemplary embodiment of the present invention.

The differential gear set 20 according to the another exemplary embodiment of the present invention uses a second planetary gear set 25 of a single pinion type and thus has a simpler structure. The second planetary gear set 25 includes a pinion 27 formed integrally with a pinion 23 of a first planetary gear set 21, a sun gear 26 coupled to a RH wheel shaft 6b to serves as an output side gear, and a carrier 28 coupled to the RH wheel shaft 6b while interposing a differential limiting clutch unit 30 therebetween.

In the second planetary gear set 25, the pinion 27 serves as an input side for receiving the power from the first planetary gear set 21, and the sun gear 26 serves as an output side for outputting the power to the RH wheel shaft 6b.

The operation of the clutch unit 30 according to the another exemplary embodiment are substantially same as those according to one exemplary embodiment, and thus descriptions on those are omitted.

Figure 7:
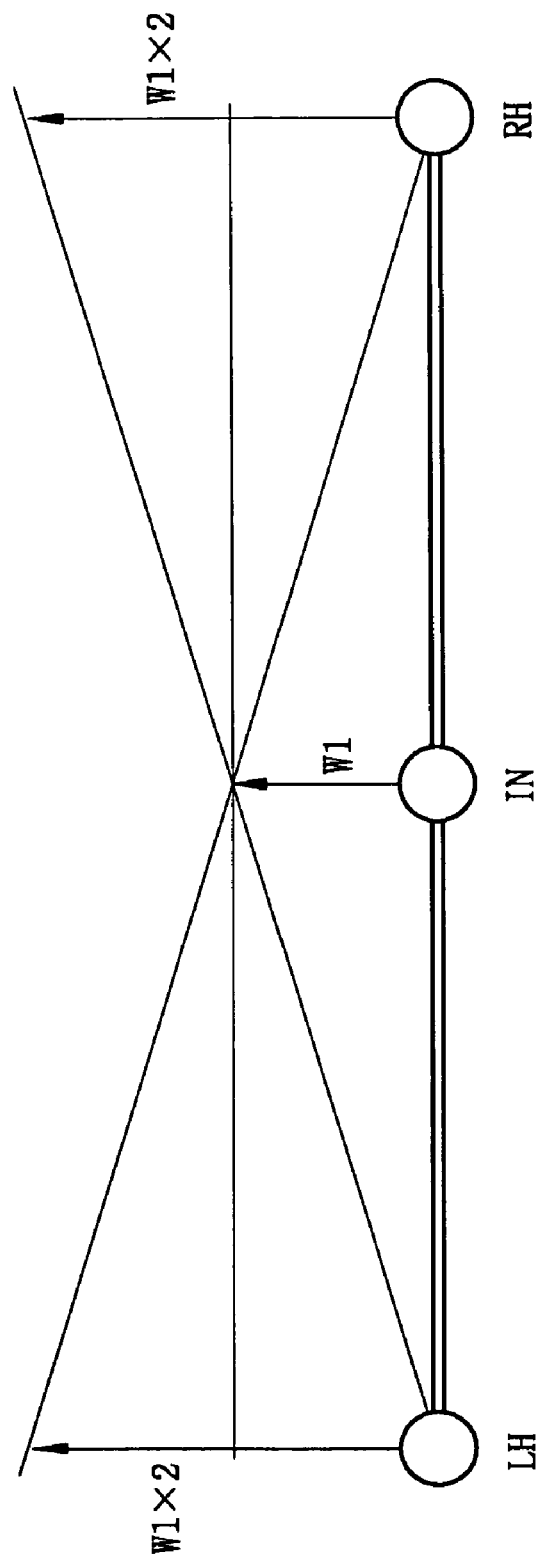
FIGS. 7 to 9 are views illustrating that a differential condition is satisfied with respect to the differential gear set of FIG. 5 according to the first preferred embodiment of the present invention.
Figure 8:
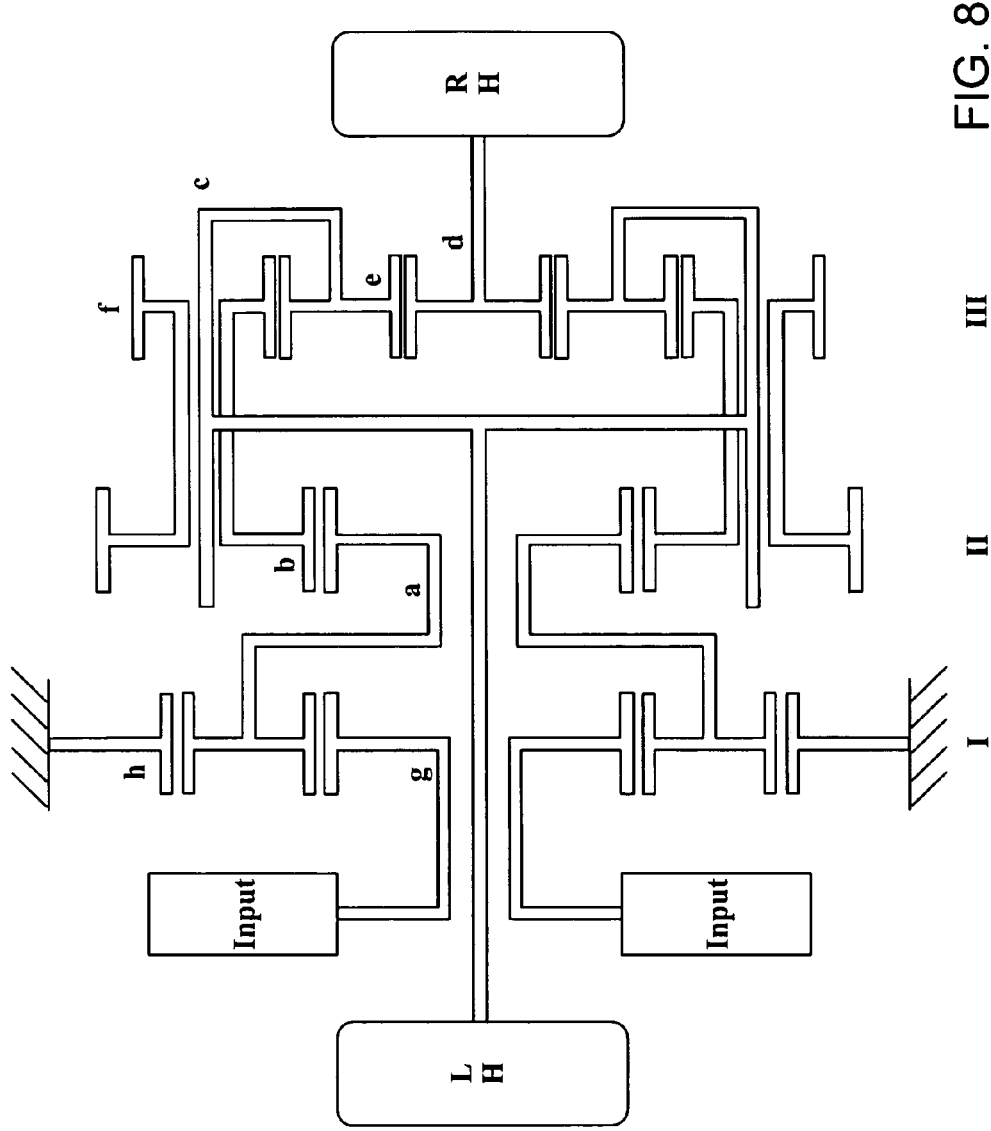
Figure 9:
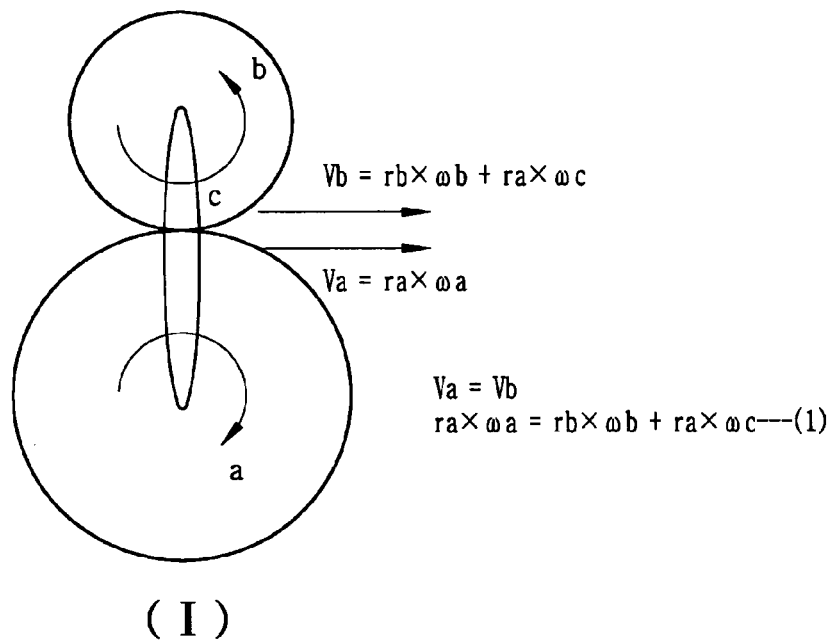
Figure 9:
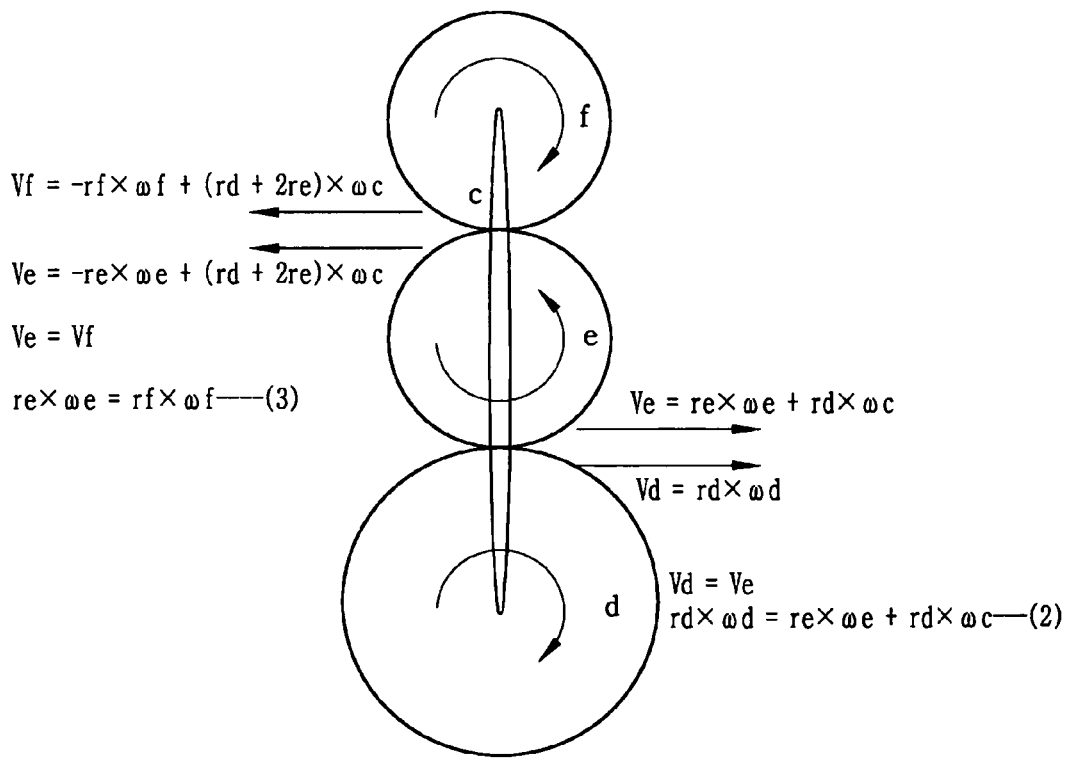

FIGS. 7 to 9 are views illustrating that a differential condition is satisfied with respect to the differential gear set of FIG. 5 according to one exemplary embodiment of the present invention. In FIG. 8, "a" and "b" denote the sun gear and the pinion which constitute the first planetary gear set of the differential gear set, respectively, and "c" denotes the carrier of the second planetary gear set (two pinions of two planetary gear sets which are integrally formed with each other are indicated by one reference).

Also, in FIG. 8, "d", "e", and "f" denote the sun gear, the internal pinion, and the external pinion of the second planetary gear set, respectively, and "g" and "h" denote the sun gear and the pinion of the reduction gear set, respectively.

In the following description, "r" denotes a radius of a corresponding gear, "z" denotes the number of a gear teeth, "w" denotes a circumferential speed of a gear, "N" denotes a revolution (e.g., RPM) of a gear, and "V" denotes a rotation speed of a gear.

The differential gear set should satisfy the following precedent condition.

In FIG. 7, $IN:LH=-RH$ ("−" denotes an opposite direction)

$LH$ or $RH$ fixed:$IN=½×LH$ or $IN=½×LH$.

In case where the reduction gear set of FIG. 8 has a deceleration structure of a simple planetary gear that the sun gear is an input, the ring gear is fixed, and the carrier is an output, $Na=[(1+\alpha)/\alpha] \times Ng$, where $\alpha=Zg/Zh$.

In (II) of FIG. 9, since $Va=Vb$ in the first planetary gear set, $ra \times \omega a = rb \times \omega b + ra \times \omega c$ [Equation (1)], and since the pinions of the first and second planetary gear sets are formed integrally with each other, $\omega b = \omega f$.

In (III) of FIG. 9, since $Vd=Ve$ in the second planetary gear set, $rd \times \omega d = re \times \omega e + rd \times \omega c$ [Equation (2)], and since $Ve=Vf$ in the second planetary gear set, $re \times \omega e = rf \times \omega f$ [Equation (3)].

Equation (4) is derived by applying "$\omega b = \omega f = (ra \times \omega a - ra \times \omega c)/rb$" to Equation (3) in Equation (1):

$$\omega e = [(ra \times rf)/(rb \times re)] \times \omega a - [(ra \times rf)/(rb \times re)] \times \omega c \quad \text{Equation (4)}$$

Equation (5) which is a speed relation equation is derived by applying Equation (4) to Equation (2):

$$(ra/rb) \times \omega a - (rd/rf) \times d - (ra/rb - rd/rf) \times \omega c = 0 \quad \text{Equation (5)}$$

Equation (6) is derived by expressing Equation (5) as a relationship of between the number of gear teeth and the revolution:

$$(Za/Zb) \times Na - (Zd/Zf) \times Nd - (Za/Zb - Zd/Zf) \times Nc = 0 \quad \text{Equation (6)}$$

Here, since Na is an input, Nc is an LH output, and Nd is a RH output, in order to satisfy the differential precedent condition of FIG. 7, a condition for the number of teeth should be "$Za/Zb = 2 \times (Zf/Zf)$ [Equation (7)]".

When Equation (7) is applied to Equation (6), it can be understood that the differential condition is satisfied since $2Na - Nd - Nc = 0$.

Figure 10:
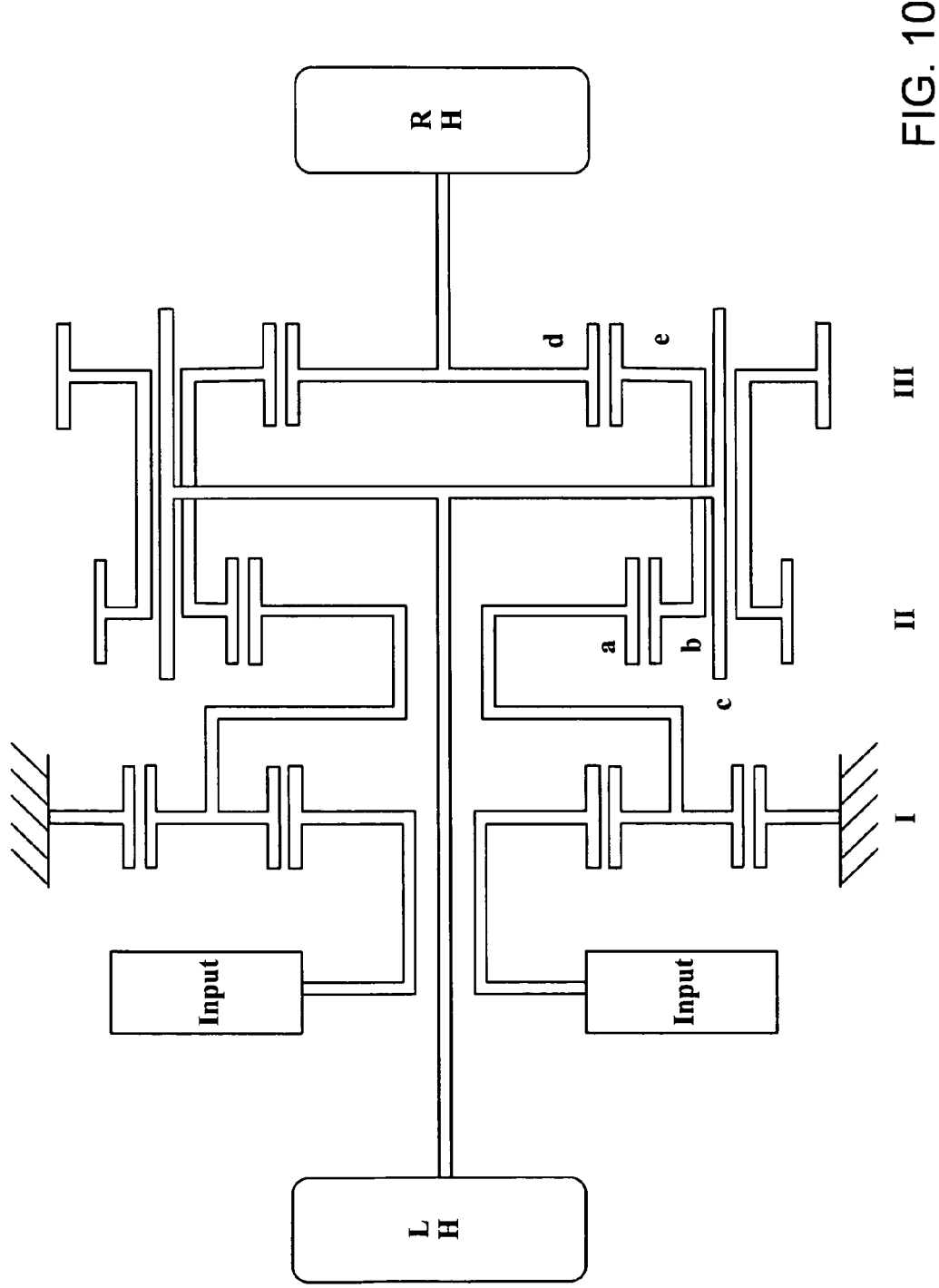
FIGS. 10 and 11 are views illustrating that a differential condition is satisfied with respect to the differential gear set of FIG. 6 according to the second preferred embodiment of the present invention.
Figure 11:
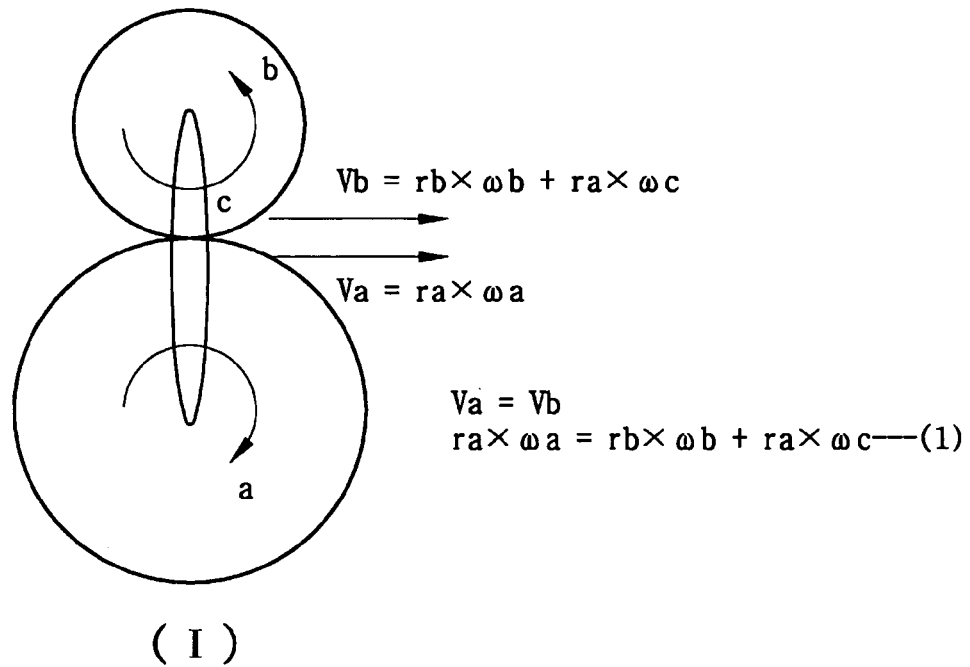
Figure 11:
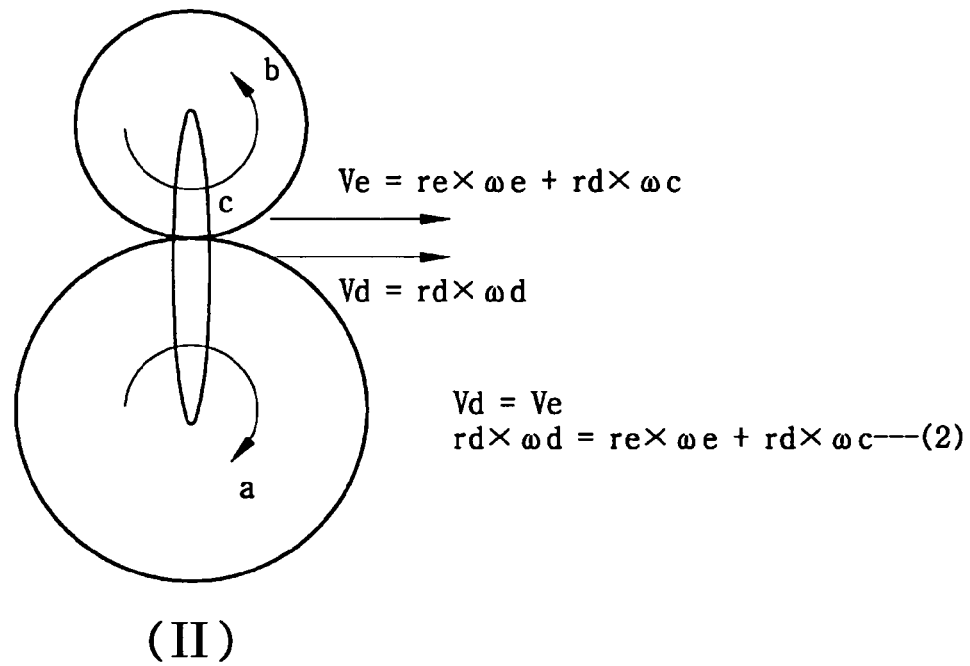

FIGS. 10 and 11 are views illustrating that a differential condition is satisfied with respect to the differential gear set of FIG. 6 according to another exemplary embodiment of the present invention. In FIG. 10, "a" and "b" denote the sun gear and the pinion which constitute the first planetary gear set of the differential gear set, respectively, and "c" denotes the carrier of the second planetary gear set (two pinions of two planetary gear sets which are integrally formed with each other are indicated by one reference).

Also, in FIG. 10, "d" and "e" denote the sun gear and the pinion of the second planetary gear set, respectively.

In (II) of FIG. 11, since $Va=Vb$ in the first planetary gear set, $ra \times \omega a = rb \times \omega b + ra \times \omega c$ [Equation (8)], and since the pinions of the first and second planetary gear sets are formed integrally with each other, $\omega b = \omega e$.

In (III) of FIG. 11, since $Vd=Ve$ in the second planetary gear set, $rd \times \omega d = re \times \omega e + rd \times \omega c$ [Equation (9)].

Equation (10) is derived by applying "$\omega b = \omega e = (ra \times \omega a - ra \times \omega c)/rb$" to Equation (9) in Equation 8:

$$(ra/rb) \times \omega a - (rd/rf) \times \omega d - (rd/re - ra/rb) \times \omega c = 0 \quad \text{Equation (10)}.$$

Here, Equation 11 is derived when a radius and a circumferential speed are respectively replaced with the number of gear teeth and the revolution:

$$(Za/Zb) \times Na - (Zd/Ze) \times Nd + (Zd/Ze - Za/Zb) \times Nc = 0 \quad \text{Equation (11)}.$$

Here, since Na is an input, Nc is an LH output, and Nd is a RH output, in order to satisfy the differential precedent condition of FIG. 7, a condition for the number of teeth should be "$Za/Zb = 2 \times Zd/Ze$ [Equation (12)]".

When Equation (12) is applied to Equation (11), it can be understood that the differential condition is satisfied since $2Na - Nd - Nc = 0$.

As described above, in the rear wheel drive apparatus of the 4WD hybrid electric vehicle according to the present invention, instead of removing the bevel gear structure of the conventional difference unit, the motor, the reduction gear set, the differential gear set, and the differential limiting clutch unit are arranged on one shaft to perform a vehicle driving, a regeneration function, a differential function, and a differential limiting function, and the reduction gear set and the differential gear set are configured of a compound planetary gear structure, thereby improving mechanical and spatial efficiency, reducing the number of parts, simplifying the structure, and reducing manufacturing cost.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A rear wheel drive apparatus for a four wheel drive hybrid electric vehicle, comprising:
    a motor generator for driving rear wheels;
    a reduction gear set for reducing an output speed of the motor generator and transmitting the reduced output speed;
    a differential gear set interposed between the reduction gear set and right and left wheel shafts of the rear wheels; and
    a clutch unit interposed between the differential gear set and the right wheel shaft to perform a differential limiting,
    wherein the motor generator, the reduction gear set, the differential gear set and the differential limiting clutch unit are arranged in a single shaft structure according to the right and left wheel shafts in a state that the left wheel shaft is inserted into a hollow inner part of an output shaft of the motor generator,
    the reduction gear set includes a planetary gear set in which a ring gear is fixed, a sun gear is coupled to the motor output shaft, and a carrier is provided through which output is transmitted, and
    the differential gear set includes a first planetary gear set interposed between the carrier of the reduction gear set and the left wheel shaft, and a second planetary gear set interposed between the first planetary gear set and the right wheel shaft,
    wherein the first planetary gear set is provided with a sun gear coupled to the carrier of the reduction gear set and a carrier coupled to the left wheel shaft.

2. The rear wheel drive apparatus of claim 1, wherein the second planetary gear set includes a sun gear coupled to the right wheel shaft and a carrier between which and the right wheel shaft the differential limiting clutch unit is interposed.

3. The rear wheel drive apparatus of claim 2, wherein the first planetary gear set comprises first pinions, the second planetary gear set comprises second pinions, and the first and second pinions are formed integrally with each other.

4. The rear wheel drive apparatus of claim 3, wherein the second planetary gear set is a planetary gear set of a double pinion type comprising an internal pinion engaged with the sun gear and an external pinion engaged with the internal pinion, and the external pinion is formed integrally with the pinion of the first planetary gear set.

5. The rear wheel drive apparatus of claim 3, wherein the second planetary gear set is a planetary gear set of a single pinion type in which the pinion is formed integrally with the pinion of the first planetary gear set.

* * * * *